July 1, 1958 W. SHUMATE 2,841,773
PRESSURE CONTACT TYPE TERMINAL BLOCK
Filed March 2, 1956 2 Sheets-Sheet 1
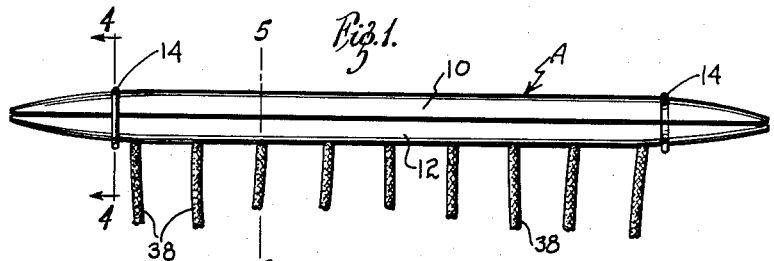
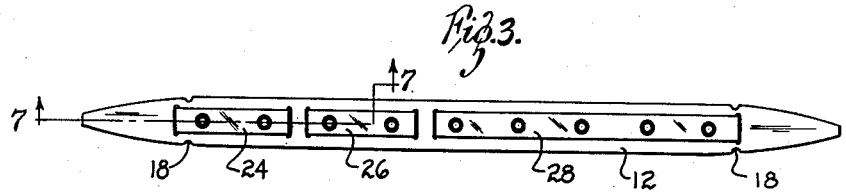
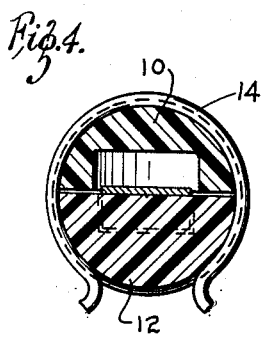
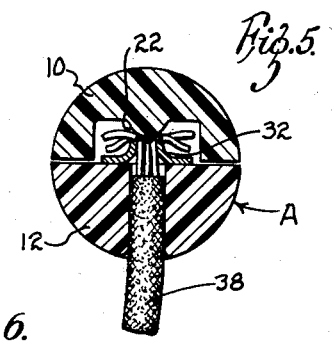
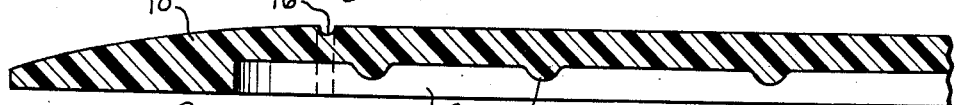
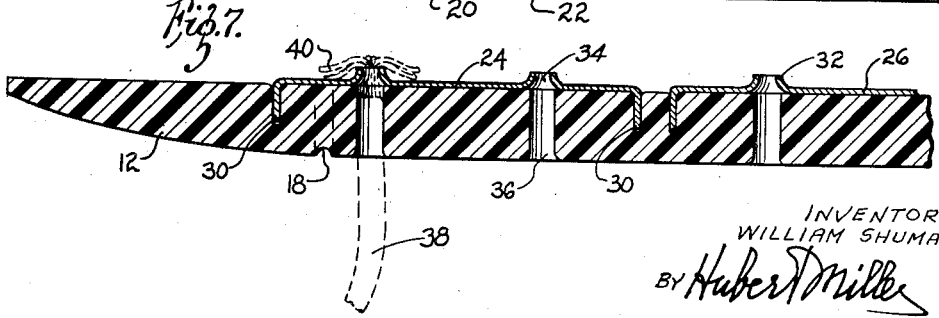
INVENTOR:
WILLIAM SHUMATE,
BY Hubert Miller
ATTORNEY July 1, 1958
W. SHUMATE
2,841,773
PRESSURE CONTACT TYPE TERMINAL BLOCK
Filed March 2, 1956
2 Sheets-Sheet 2
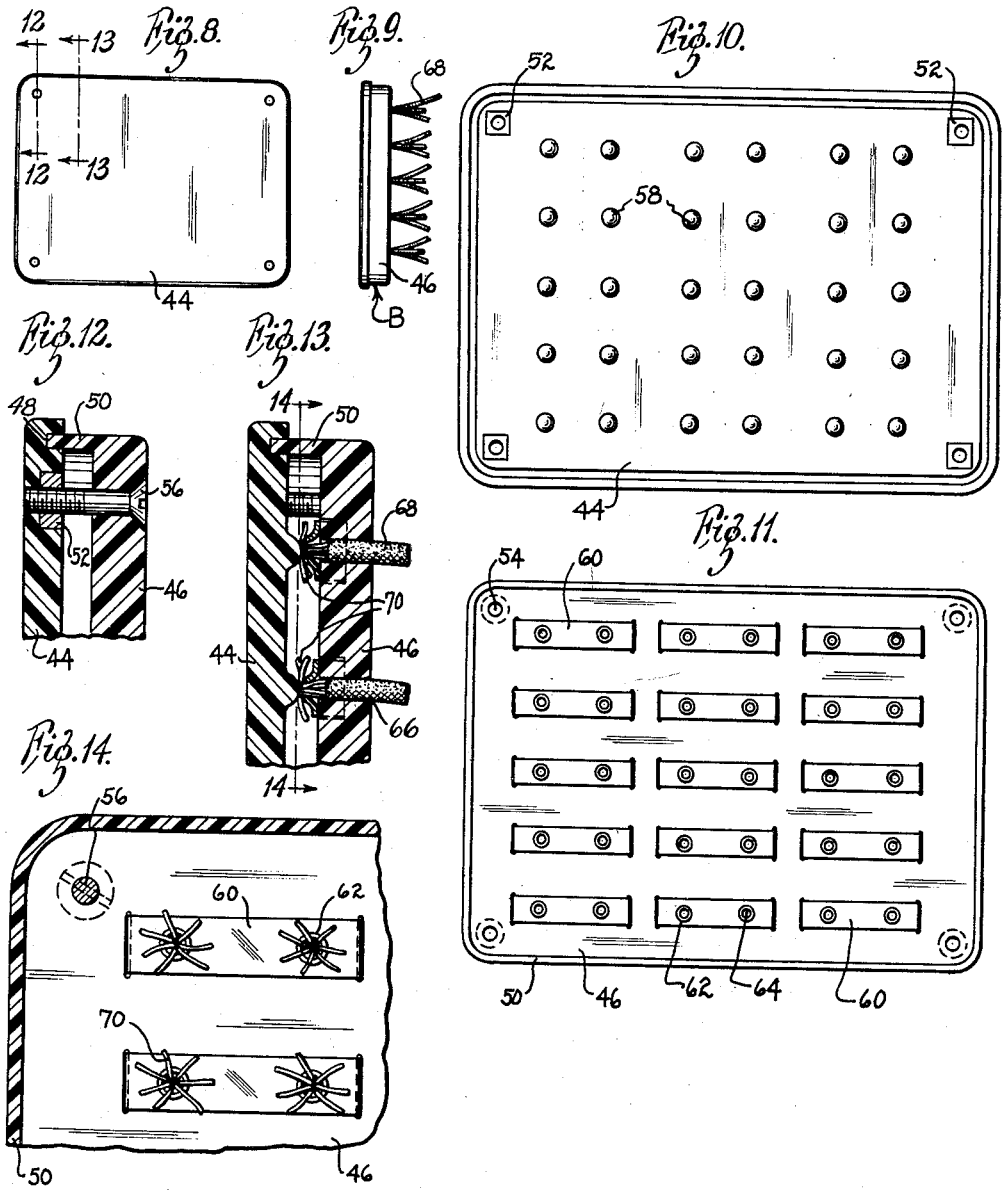
INVENTOR:
WILLIAM SHUMATE,
BY Hubert T Miller
ATTORNEY United States Patent Office 2,841,773
Patented July 1, 1958

2,841,773
PRESSURE CONTACT TYPE TERMINAL BLOCK

William Shumate, Wichita, Kans., assignor to Boeing Airplane Company, Wichita, Kans., a corporation of Delaware Application March 2, 1956, Serial No. 569,073

6 Claims. (Cl. 339—198)

This invention relates generally to electrical connectors and pertains more particularly to a terminal block in which the ends of stranded conductors are securely held in place by pressural action.

The primary object of the invention is to provide a terminal block that may be separated easily into two halves for the quick connection or disconnection of stranded electrical conductors or wires. More specifically, it is an aim of the invention to achieve the foregoing result without resort to soldering or complex mechanical arrangements. Instead, the present invention contemplates a simple construction whereby the stranded ends of electrical conductors are subjected to a high degree of concentrated force which acts in a direction to press the conductor ends against a metallic terminal strip or strips disposed within the separable terminal block.

Another object of the invention is to provide a terminal block utilizing only a few parts, even though a relatively large number of conductor ends are to be accommodated. In this regard, it is intended that only two casing members be employed, one of which is equipped with a series of rounded buttons capable of bearing against a corresponding number of conductor ends which have been inserted through aligned holes in the other casing member and through holes similarly arranged in the various terminal strips. While it is contemplated that a separate terminal strip frequently be provided for each pair of conductor ends, it is entirely practical to have more than two conductor ends bear against a single or lesser number of terminal strips, should circuit conditions so dictate. At any rate, it is to be appreciated that virtually any given number of wires may be accommodated by properly dimensioning and designing the casing members in accordance with the teachings of my invention.

Not only does the invention achieve a high degree of reliability in the anchoring of the conductor ends, but additionally the invention has for an object the simplification of the various parts making up the terminal block. For instance, the invention envisages the use of terminal strips which do not require elaborate mounting means, it being an aim to have the pressure utilized in effecting the various electrical connections also assure retention of the terminal strips in place. Accordingly, it can be stated generally that the invention proposes a terminal block that can be manufactured quite inexpensively, thereby contributing to its widespread acceptance for reasons other than the practical benefits to be derived from its use.

The invention, together with other objects attending its production, will be more clearly understood when the following description is read in connection with the accompanying drawings, in which:

Figure 1 is a side elevational view of one embodiment that my invention may assume;

Figure 2 is a bottom plan view of the upper half of the terminal block depicted in Figure 1;

Figure 3 is a top plan view of the lower half of the terminal block of Figure 1;

Figure 4 is a sectional view taken in the direction of line 4—4 of Figure 1 in order to illustrate to better advantage one of the resilient snap rings used in retaining the two terminal block halves together;

Figure 5 is a sectional view taken in the direction of line 5—5 of Figure 1 picturing the manner in which one of the stranded conductor ends is secured within the terminal block;

Figure 6 is a sectional view taken in the direction of line 6—6 of Figure 2 showing to better advantage the various pressure buttons, one of which buttons is utilized in the conductor end securement pictured in Figure 5;

Figure 7 is a sectional view taken in the direction of line 7—7 of Figure 3 depicting the various terminal strips and their mode of anchorage to the lower half of the terminal block;

Figure 8 is a top plan view of a different embodiment of the invention;

Figure 9 is a right hand view of the modification presented in Figure 8;

Figure 10 is a bottom plan view of the upper half of the terminal block set forth in Figure 8;

Figure 11 is a top plan view of the bottom half of the terminal block of Figure 8;

Figure 12 is a sectional view taken in the direction of line 12—12 of Figure 8 in order to illustrate one of the screw elements utilized in retaining the casing members of this embodiment together;

Figure 13 is a sectional view taken in the direction of line 13—13 picturing the manner in which the stranded conductor ends are anchored in place, and Figure 14 is a sectional view taken in the direction of line 14—14 of Figure 13.

Referring first to the embodiment of Figures 1–7 it can be discerned that the terminal block here presented and designated in its entirety by the character A possesses a pencil-shaped configuration, being comprised of an upper elongated casing member 10 and a lower elongated casing member 12, both of suitable plastic material, such as Bakelite. These members 10, 12 are detachably held together by a snap ring or resilient clamp 14 located near each end in circumferential grooves 16 and 18 formed in the surfaces of these two members. While the rings 14 exert a considerable amount of clamping force against the two members 10, 12 in retaining them together, nonetheless a prying removal of the rings will effect an easy separation of the two members.

The upper member 10 is relieved or recessed over a considerable portion of its bottom face, as designated by the numeral 20. However, in molding or otherwise forming the member 10 a plurality of convex pressure buttons 22 are left projecting from the top or roof of the recessed portion 20. More will be said presently concerning the specific role played by these buttons.

The lower member 12 carries on its upper face a plurality of metallic terminal strips 24, 26 and 28 having their ends 30 turned downwardly and press fitted into slots formed in the body of this member. The various strips 24, 26 and 28 are provided with integral tubular collars 32 forming a series of apertures 34 in registry with further passages or apertures 36 extending from the bottom to top side of the lower member. These various apertures 34, 36 are disposed in alignment with the previously mentioned buttons 22 when the two halves 10, 12 are placed together.

As can be seen from Figure 1, a series of stranded conductors 38 are to be connected to the terminal block A, and as better viewed in Figures 5 and 7 each bared end 40 of the various conductors is inserted through the apertures 36, 34 and is then fanned or spread apart so that the strands thereof will overhang the upper edge of each collar 32. By so doing, the buttons 22, when the casing halves 10, 12 are clamped together by means of the rings 14, will seat on the various fanned conductor ends 40, pressing these ends into firm electrical contact with the collars 32 and hence the terminal strips 24, 26 and 28, inasmuch as the collars are an integral part of these strips.

To illustrate the versatility of the terminal block A, specific attention is now directed to Figure 3 where it can be seen that the terminal strips need not all be of uniform length. In the exemplified instance it is to be noted that the strips 24, 26 are each provided with two collars 32 and therefore capable of accommodating the same number of conductor ends 40, whereas the terminal strip 28 is considerably longer, being provided with five collars 32 and therefore capable, of course, of accommodating five conductor ends. Thus, it will be appreciated that the terminal block A may be designed for specific circuit conditions that are to be encountered during a particular installation or use of the terminal block. If desired, the lower half 12 may be formed with a relatively large number of slots for the reception of the strip ends 30, leaving it up to the customer to press fit into place the length of terminal strip best suited for a given job. When this procedure is adopted, then quite obviously the terminal strips must be supplied, preferably by the manufacturer of the casing, with dimensions that will result in good registry between the various apertures 34 and 36. Of course, if a longer terminal strip is desired under these condtiions, say similar in length to the strip 28, it will merely bridge over some of the slots that would otherwise be used for the ends 30 on shorter terminal strips. While the press fit of the ends 30 may be adequate in positioning the strips 24, 26 and 28, it is to be observed that pressure is applied by the buttons 22 to the various terminal strips 24, 26 and 28 in such a direction as to anchor more firmly the strips when the two members 10, 12 are clamped together.

To illustrate further the flexibility of design possible in a terminal block constructed in accordance with the instant invention, reference should now be had to the modification labeled B in Figures 8–14. In this construction the terminal block comprises a front panel member 44 and a rear panel member 46, both being of plastic composition as were the earlier discussed members 10 and 12 of the terminal block A. By means of a groove 48 formed in the inner face of the member 44 and a flange or rib 50 on the member 46 the two panels are rabbeted together. The rabbet fit mentioned above provides a convenient way of properly orienting the two panels with respect to each other. Adjacent the four corners of the panel member 44 are fixedly embedded nut elements 52 and through a corresponding number of apertures 54 located in the corners of the panel member 46 extend a plurality of screws 56 which threadedly engage the nut elements 52 to retain the two panels together.

In this situation there is a plurality of pressure buttons 58 formed on the inner face of the panel member 44. On the other member 46 are disposed various metallic terminal strips 60 having their ends bent perpendicularly and press fitted into slots formed in said member, each strip in the exemplified instance being provided with a pair of integral collars 62 having apertures 64 passing therethrough. The apertures 64 are in registry with apertures 66 formed in the plastic member 46. Through the apertures 66 and the apertures 64 extend stranded electrical conductors 68 having bared ends 70 which are fanned or spread apart as can readily be seen in Figure 14. As in the previously described embodiment A, the pressure buttons 58 of the terminal block B exert a pressural action against the fanned ends 70 to force them into firm electrical contact with the various tubular collars 62, this action being derived from the tightening of the several screws 56 which literally pull the panel member 44 and its aligned buttons 58 into this seating relationship.

From the description of the modification B it is believed apparent that practically any number of conductors 68 may be accommodated. Also, as with the embodiment A, the terminal strips 60 are susceptible of having different lengths, although they are all depicted as having equal dimensions.

Having described the invention with sufficient clarity to enable those familiar with this art to construct and use it, I claim:

1. A terminal block structure comprising a first electrically non-conductive member having at least one substantially planar surface and having spaced conductor receiving apertures therethrough disposed substantially normal to said surface; a conductive terminal strip carried flat on said surface and having apertures therethrough in registry with the respective apertures in said first member; a second electrically non-conductive member having a surface cooperable with the planar surface of the first member, the said surface of the second member having a plurality of spaced integral outwardly projecting pressure buttons thereon located to register with the respective apertures in said terminal strip; and means independent of and spaced from said terminal strip for clamping the two members together with their mentioned cooperating surfaces in close proximity.

2. A terminal block structure in accordance with claim 1 in which the apertures in said terminal strip have raised portions circumjacent thereto.

3. A terminal block structure in accordance with claim 1 in which the ends of said terminal strip are bent normal to the general plane thereof and are press fitted into slots provided in said first member.

4. A terminal block structure comprising a first electrically non-conductive member having a plurality of apertures extending therethrough, a metallic terminal strip affixed flat against a surface of said first member and formed with a plurality of integral outwardly projecting tubular collars thereon, each collar having an aperture extending therethrough in registry with and providing a continuation of a respective aperture of said first member, a second member having a surface confronting said surface of the first member and provided with a plurality of convex pressure buttons disposed in registry with the apertures of said collars, and means independent of and spaced from said terminal strip for holding said members tightly together.

5. A terminal block structure comprising a first member having a series of apertures extending therethrough; a plurality of metallic terminal strips overlying the apertures of said first member, each strip having at least two apertures therein in registry with a corresponding number of apertures in said first member, a plurality of stranded conductors extending through the apertures of said first member and the apertures in said terminal strips, the ends of said conductors being spread apart to overlie the regions of said terminal strips adjacent the apertures thereof, a second member cooperable with said first member having a plurality of convex pressure buttons disposed in registry with the apertures in said terminal strips, and means for holding said members together to cause said buttons to seat on the spread ends of said conductors.

6. A terminal block structure in accordance with claim 5 in which there is an upstanding tubular collar circumjacent each aperture of said terminal strips and the spread conductor ends overlie the respective upper edges of these collars.

References Cited in the file of this patent

UNITED STATES PATENTS

| 2,489,013 | Dasher | Nov. 22, 1949 |
| 2,556,956 | Benton et al. | June 12, 1951 |
| 2,567,783 | Richardson | Sept. 11, 1951 |
| 2,703,394 | Arthur et al. | Mar. 1, 1955 |

FOREIGN PATENTS

| 494,742 | France | June 6, 1919 |
| 621,307 | Great Britain | Apr. 7, 1949 |